(12) United States Patent
Jia et al.

(10) Patent No.: US 6,896,982 B2
(45) Date of Patent: May 24, 2005

(54) CONDITIONING METHOD FOR FUEL CELLS

(75) Inventors: Nengyou Jia, Richmond (CA); Benno Giesecke, Vancouver (CA)

(73) Assignee: Ballard Power Systems Inc., Burnaby (CA)

(*) Notice: Subject to any disclaimer, the term of this patent is extended or adjusted under 35 U.S.C. 154(b) by 377 days.

(21) Appl. No.: 10/158,408

(22) Filed: May 30, 2002

(65) Prior Publication Data

US 2003/0224226 A1 Dec. 4, 2003

(51) Int. Cl.⁷ .......................... H01M 8/00; H01M 8/18; H01M 2/14
(52) U.S. Cl. .............................. 429/13; 429/19; 429/39
(58) Field of Search .............................. 429/13, 19, 34, 429/39, 30

(56) References Cited

U.S. PATENT DOCUMENTS

| | | | | |
|---|---|---|---|---|
| 4,555,452 | A | 11/1985 | Kahara et al. ................. | 429/13 |
| 6,187,464 | B1 | 2/2001 | Yasumoto et al. ............ | 429/13 |
| 6,399,231 | B1 * | 6/2002 | Donahue et al. .............. | 429/13 |
| 2001/0055705 | A1 | 12/2001 | Yagi ............................ | 429/13 |

FOREIGN PATENT DOCUMENTS

| | | | |
|---|---|---|---|
| CA | 2341140 | 3/2001 | |
| EP | 0018693 | 11/1980 | |
| JP | 63-026961 | 2/1988 | |
| JP | 06-251788 | 9/1994 | |
| JP | 09-266004 | * 7/1997 | ............ H01M/8/04 |
| JP | 2001-229951 | 8/2001 | |
| JP | 2002-042849 | 2/2002 | |
| JP | 2002-093448 | 3/2002 | |
| WO | WO 99/34465 | 7/1999 | |
| WO | WO 01/01508 | 1/2001 | |
| WO | WO 01/03215 | 1/2001 | |
| WO | WO 01/22515 | 3/2001 | |
| WO | WO 01/99218 | 12/2001 | |

OTHER PUBLICATIONS

Abstract of JP 63–026961, Patent Abstracts of Japan, Feb. 4, 1988.
Translation of JP 63–026961, JPO, Feb. 4, 1988.
Abstract of JP 06–251788, esp@cenet database, Sep. 9, 1994.
Machine translation of JP 06–251788, JPO, Mar. 11, 2002.
Machine translation of JP 2001–229951, JPO, Apr. 11, 2002.
Abstract of JP 2002–042849, Patent Abstracts of Japan, Feb. 8, 2002.
Abstract of JP 2002–093448, espacenet database, Mar. 29, 2002.
Translation of WO 01/22515, WIPO, Mar. 29, 2001.
Appleby and Borucka, "Oxygen Dissolution and Evolution on Platinum in 85% Orthophosphoric Acid at Elevated Temperatures," *Journal of the Electrochemical Society* 116:1212–1218, Sep. 1969.
He et al., "An Electrochemical Method to Improve the Performance of Air Cathodes and Methanol Anodes," *Electrochemical and Solid–State Letters* (8)8:A181–A183, 2002.
Pourbaix, *Atlas of electrochemical Equilibria in Aqueous Solutions*, 2nd ed., National Association of Corrosion Engineers, Houston, Texas, 1974, pp. 379–383.

* cited by examiner

*Primary Examiner*—Patrick Ryan
*Assistant Examiner*—Julian Mercado
(74) *Attorney, Agent, or Firm*—Seed IP Law Group PLLC

(57) ABSTRACT

Certain fuel cells (e.g., solid polymer electrolyte fuel cells) may temporarily exhibit below normal performance after initial manufacture or after prolonged storage. While normal performance levels may be obtained after operating such fuel cells for a suitable time period, this process can take of order of days to fully complete. However, exposing the cathode to a reductant (e.g., hydrogen) can provide for normal performance levels without the need for a lengthy initial operating period.

8 Claims, 1 Drawing Sheet

CONDITIONING METHOD FOR FUEL CELLS

BACKGROUND OF THE INVENTION

1. Field of the Invention

The invention relates to methods for conditioning fuel cells such that they are capable of performing normally after initial manufacture or after prolonged storage. In particular, it relates to methods for conditioning solid polymer fuel cells.

2. Description of the Related Art

Fuel cell systems are increasingly being used as power supplies in various applications, such as stationary power plants and portable power units. Such systems offer promise of economically delivering power while providing environmental benefits.

Fuel cells convert fuel and oxidant reactants to generate electric power and reaction products. They generally employ an electrolyte disposed between cathode and anode electrodes. A catalyst typically induces the desired electrochemical reactions at the electrodes. Preferred fuel cell types include solid polymer electrolyte (SPE) fuel cells that comprise a solid polymer electrolyte and operate at relatively low temperatures. Another fuel cell type that operates at a relatively low temperature is the phosphoric acid fuel cell.

SPE fuel cells employ a membrane electrode assembly (MEA) that comprises the solid polymer electrolyte or ion-exchange membrane disposed between the cathode and anode. (Typically, the electrolyte is bonded under heat and pressure to the electrodes and thus such an MEA is dry as assembled.) Each electrode contains a catalyst layer, comprising an appropriate catalyst, located next to the solid polymer electrolyte. The catalyst is typically a precious metal composition (e.g., platinum metal black or an alloy thereof) and may be provided on a suitable support (e.g., fine platinum particles supported on a carbon black support). The catalyst layers may contain ionomer similar to that used for the solid polymer membrane electrolyte (e.g., Nafion®). The electrodes may also contain a porous, electrically conductive substrate that may be employed for purposes of mechanical support, electrical conduction, and/or reactant distribution, thus serving as a fluid diffusion layer. Flow field plates for directing the reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell stack.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reaction product.

A broad range of reactants can be used in SPE fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell.

During manufacture of SPE fuel cells, it is common to employ a conditioning or activating step in order to hydrate the membrane and also any ionomer present in the catalyst layers (e.g., as disclosed in Canadian patent application serial number 2,341,140). However, the fuel cells may also be "run in". For instance, they may be operated for a period of time under controlled load conditions in a manner akin to a breaking in period, after which the nominal rated performance of the fuel cell is obtained. Such a breaking in process however may be onerous in large-scale manufacture since connecting up and operating each stack represents a relatively complex, time-consuming, and expensive procedure.

For various reasons, fuel cell performance can fade with operation time or as a result of storage. However, some of these performance losses may be reversible. For instance, the negative effect of the membrane electrolyte and/or other ionomer drying out during storage can be reversed by rehydrating the fuel cell. Also, the negative effects of CO contamination of an anode catalyst can be reversed using electrical and/or fuel starvation techniques. Published PCT patent applications WO99/34465, WO01/01508, and WO01/03215 disclose some of the other various advantages and/or performance improvements that can be obtained using appropriate starvation techniques in fuel cells.

While some of the mechanisms affecting performance in fuel cells are understood and means have been developed to mitigate them, other mechanisms affecting performance are not yet fully understood and unexpected effects on performance are just being discovered.

BRIEF SUMMARY OF THE INVENTION

In certain circumstances, a fuel cell may be performing below normal, but with prolonged operation, fuel cell performance may slowly rise to normal. In such circumstances, it has been discovered that performance can be timely improved by appropriately exposing the cathode to a reductant. For instance, this method may be used to activate a fuel cell after initial manufacture, thereby obviating a lengthy activation process. Alternatively, this method may be used to rejuvenate a fuel cell following prolonged storage.

The conditioning method is used prior to normal operation. Herein, normal operation is defined as supplying a fuel stream to the anode of the fuel cell, supplying an oxidant stream to the cathode of the fuel cell, and supplying power from the fuel cell to an external electrical load. The conditioning method then comprises directing a fluid comprising a reductant to the cathode without supplying oxidant to the cathode. Further, the fluid comprising the reductant may be directed to the cathode without supplying power from the fuel cell to the external electrical load. Thus, while shorting and/or starvation techniques may also be employed, they are not required using the present method. A preferred reductant is hydrogen although other reductants (e.g., hydrogen peroxide) may be used instead.

The method is suitable for use with fuel cells whose cathode comprises a precious metal catalyst (e.g., platinum) and is particularly suitable for use with typical solid polymer electrolyte fuel cells. In the method, the reductant may desirably be heated and humidified before directing to the cathode. The reductant fluid is typically directed to a cathode flowfield in the fuel cell.

The method is particularly advantageous for manufacturing purposes and for commercial applications where the fuel cell stack spends prolonged periods inactive and yet desirably delivers normal output power in a timely manner once put into service. In this regard, it may be desirable that the commercial fuel cell system is capable of automatically conditioning itself (i.e., self-conditioning).

A possible embodiment of a self-conditioning system comprises a fuel cell, a fuel supply system, an oxidant supply system, and a controller. In this embodiment, the fuel cell comprises an anode, a cathode, and an electrolyte. The fuel supply system comprises a fuel supply, fuel supply lines fluidly connecting the fuel supply to the anode and the cathode, and fuel valving for controlling the flow of fuel to the anode and to the cathode. The oxidant supply system comprises an oxidant supply, an oxidant supply line fluidly connecting the oxidant supply to the cathode, and oxidant valving for controlling the flow of oxidant to the cathode. Finally, the controller is used to control the fuel and oxidant valving such that fuel is supplied to the anode and that oxidant is supplied to the cathode during normal operation, but such that fuel is supplied to the cathode and that oxidant is not supplied to the cathode during conditioning.

DETAILED DESCRIPTION OF THE INVENTION

Figure 1:
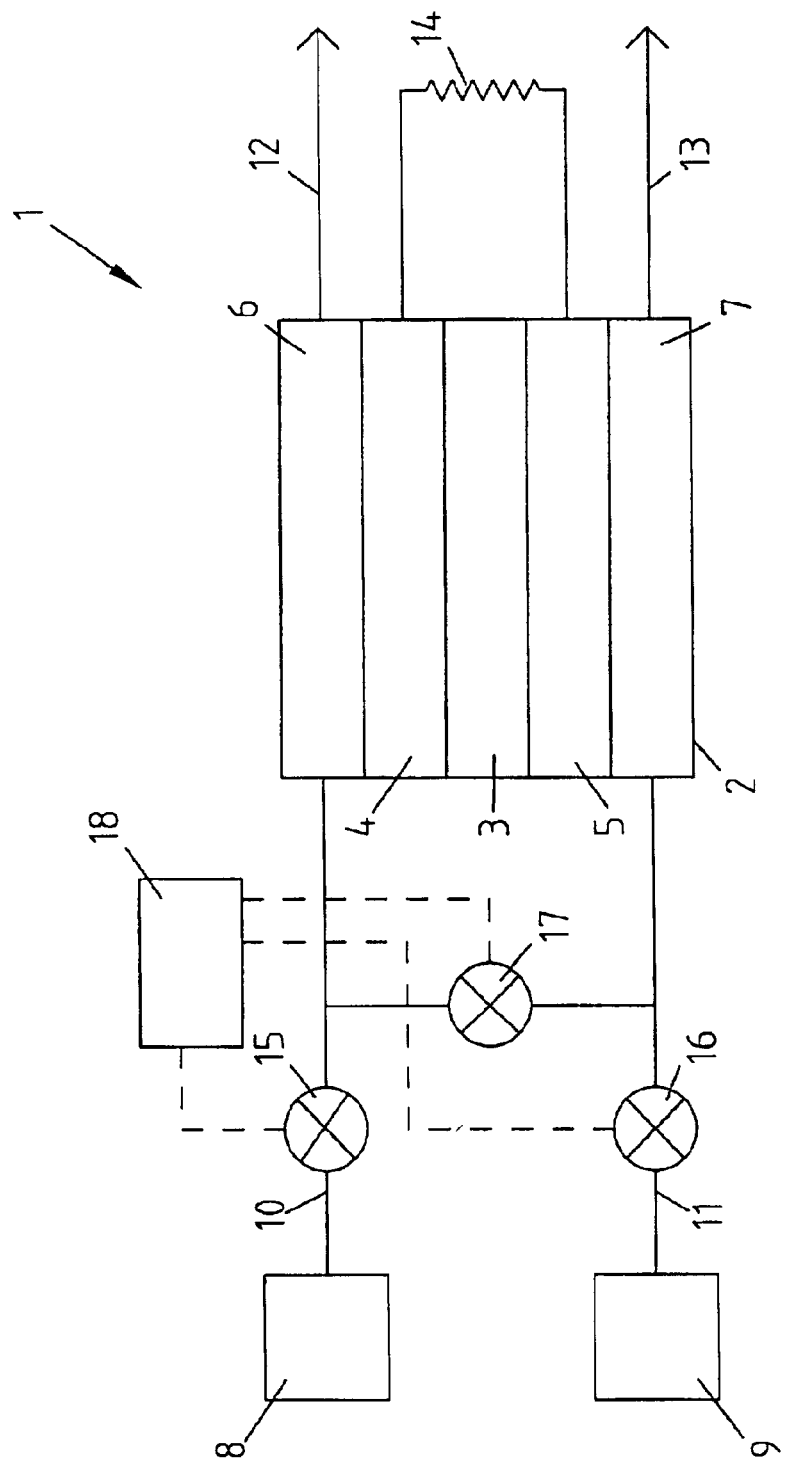
FIG. 1 is a schematic diagram of a solid polymer fuel cell system equipped to condition the fuel cell by directly supplying hydrogen gas to the cathode.

FIG. 1 shows a schematic diagram of a solid polymer fuel cell system in which the fuel cell may be self-conditioned in accordance with the invention. Conditioning may be performed either to rejuvenate the fuel cell after undergoing a temporary performance loss as a result of prolonged storage or to activate the fuel cell such that it is capable of nominal performance immediately after initial manufacture.

For simplicity, FIG. 1 shows only one cell in the fuel cell stack in system 1. Fuel cell stack 2 comprises a membrane electrode assembly consisting of solid polymer electrolyte membrane 3 sandwiched between cathode 4 and anode 5. (Both cathode 4 and anode 5 comprise porous substrates and catalyst layers which are not shown.) Stack 2 also comprises cathode flow field plate 6 and anode flow field plate 7 for distributing reactants to cathode 4 and anode 5 respectively. System 1 also has fuel and oxidant supply systems containing oxidant supply 8 (typically air, which may be supplied by a blower or compressor) and fuel supply 9 (considered here to be a source of hydrogen gas).

During normal operation, oxidant and fuel streams are supplied to flow field plates 6 and 7 respectively via oxidant and fuel supply lines 10 and 11 respectively. The oxidant and fuel streams exhaust from stack 2 via exhaust lines 12 and 13 respectively. Power from stack 2 is delivered to external electrical load 14, which is electrically connected across the terminals of stack 2.

In FIG. 1, system 1 is equipped to condition stack 2 by directly supplying cathode 4 with hydrogen gas. System 1 includes oxidant shutoff valve 15, fuel shutoff valve 16, fuel conditioning valve 17, and controller 18. The operation of the valves is controlled by controller 18 via the various dashed signal lines depicted in FIG. 1. During normal operation, oxidant shutoff valve 15 and fuel shutoff valve 16 are open, while fuel conditioning valve 17 is closed. Thus, oxidant and fuel (hydrogen here) are supplied normally to cathode 4 and anode 5 respectively. When the system is inactive (e.g., during storage), valves 15, 16, and 17 are all closed and there is no flow of reactant to or from stack 2. (Not shown in FIG. 1 are shutoff valves in exhaust lines 12 and 13, which may also be provided to prevent contaminants from entering stack 2.) For conditioning however, controller 18 signals oxidant shutoff valve 15 to close and signals fuel shutoff valve 16 and fuel conditioning valve 17 to open thereby providing hydrogen directly to cathode 4. A flow of hydrogen to anode 5 is optional when conditioning using the system of FIG. 1. Thus, flow through anode flow field plate 7 may be prevented by use of an additional shutoff valve in fuel exhaust line 13 if desired (not shown). In general, the presence of external electrical load 14 during conditioning is also optional. However, depending on the specific embodiment, it may be desirable to disconnect load 14 (e.g., to protect it from power surges) or to keep it connected instead (to additionally implement a starvation condition).

Stack 2 is rejuvenated by exposing cathode 6 to hydrogen. Preferably the hydrogen is heated and humidified in order to accelerate the rejuvenation process. Means for heating and humidifying may thus desirably be included as part of hydrogen supply 9.

System 1 is thus equipped to condition itself as is required in the field. Controller 18 may be programmed for instance to run the system through a conditioning cycle every time it is started up to ensure that the fuel cell is operating normally. In such a case, the starting sequence may then involve automatic configuring of valves 15, 16, and 17 so as to condition for a brief period (e.g., of order of a minute), followed by a configuring for normal operation.

The method of the invention can also be readily employed on conventional SPE fuel cell systems, in which case the operator arranges conditioning as desired. Again, hydrogen is directed to the cathode either manually or via a suitable external apparatus (e.g., a conditioning unit) that can be appropriately connected to the system. Thus, conventional fuel cells or systems can be activated in this way during manufacture at a conditioning station on an assembly line. Alternatively, conventional fuel cells or systems may be rejuvenated after prolonged storage in the field or at a service center using a suitable conditioning unit.

Using the aforementioned methods, SPE fuel cells that had been adversely affected by prolonged storage can be successfully rejuvenated relatively quickly. For instance, SPE fuel cell stacks operating at current densities about 400 mA/cm$^2$ may exhibit output voltage drops of order of 10–20 mV per cell after storing under ambient conditions for a month (the voltage drops being greater at higher ambient temperature conditions). When put back into normal service without any prior conditioning, such stacks can require over a day of operation before recovering completely. On the other hand, similar stacks show almost complete recovery immediately after a conditioning period of the order of a minute.

Without being bound by theory, it is believed that the lower than nominal performance capability seen in newly manufactured SPE fuel cells or in cells subjected to prolonged storage may be due to the formation of oxides or hydroxides on the surface of the cathode catalyst. Such species could be expected to form in the presence of oxygen and water and the rate would increase at elevated temperatures. Reducing the cathode catalyst then, such as with suitable exposure to hydrogen (or other reductant) or by operating the cell for a sufficiently long period, would then be expected to react these species away. The reduction reaction would thus form water and leave behind catalyst whose surface was free of oxide/hydroxide thereby activating or rejuvenating the catalyst and also, to some extent, rehydrating the fuel cell. (Noticing an adverse effect on performance with the formation of oxides and/or hydroxides on a platinum cathode catalyst surface would be consistent with the observations of M. Pourbaix "Atlas of Electrochemical Equilibria in Aqueous Solutions", 1966, Pergamon Press, N.Y. and A. J. Appleby and A. Borucka, J. Electrochem. Soc. 116, 1212 (1969), who reported that oxygen reduction rates are higher for platinum than for platinum hydroxide or for oxidized platinum respectively.)

Accordingly, other methods to assist in the removal of surface oxides/hydroxides from the cathode catalyst or to prevent their formation are also desirably contemplated. For instance, oxidant starving techniques may be employed to assist in the removal. Also, for instance, the fuel cell might be maintained in a conditioned state in various ways in order to prevent temporary losses in performance capability. As an example, storing the fuel cell at below ambient temperature would slow the rate of formation of oxides or hydroxides. Blanketing the cathode with an inert gas such as dry nitrogen during storage would also be expected to slow the formation of oxide/hydroxide species. In this regard, a reducing atmosphere would be inert and maintaining a reducing atmosphere around the cathode (by directly admitting hydrogen or by allowing hydrogen from the anode to diffuse across the membrane electrolyte to the cathode) would be preferred.

If the fuel cell can be maintained in a suitably conditioned state, one may consider performing conditioning cycles well before the fuel cell actually needs to be used. For instance, in the embodiment of FIG. 1, one may also consider running conditioning cycles partway through a storage period or even at shutdown.

The following examples are provided to illustrate certain aspects and embodiments of the invention but should not be construed as limiting in any way.

EXAMPLE 1

A solid polymer fuel cell stack comprising 24 cells stacked in series was assembled and fully conditioned by operating it under load until its full normal performance capability was reached. Each cell in the stack contained a 115 $cm^2$ active area membrane electrode assembly with platinum catalyzed electrodes and a NAFION® N112 perfluorosulfonic acid membrane electrolyte. On both cathode and anode, carbon-supported Pt catalyst was employed on carbon fiber substrates. The stack employed serpentine flow field plates made of graphite clamped between end plates at a loading of 1200 lbs. Typical normal operation for this stack involves supplying 100% RH hydrogen and air, at about 1 and 3 psi, respectively, to the cathode and anode flow field plates respectively. The normal operating temperature of the stack is 65° C. and the maximum normal operating current for this cell is about 50 A. Under this 50 A load, the average voltage of the cells in the fully conditioned stack is about 660 mV/cell.

In the last 10 cells in the stack, the membrane electrode assemblies (MEAs) were then replaced with similar newly assembled MEAs. The reconstructed stack was then operated without any prior conditioning under a load of 50 amps. The initial average voltage of the new cells was 540 mV whereas the initial voltage of the original cells was 640 mV. The stack was run for 30 minutes during which time the membrane electrolytes in the new and original cells became hydrated or rehydrated respectively. After this period, the average voltage of the new cells had increased to about 578 mV while that of the original cells remained at about 640 mV. Next, dry, unheated hydrogen was piped through both the stack anodes and cathodes for five minutes. Immediately thereafter, the average voltage of the new cells was about 32 mV higher while the average voltage of the original cells had increased by 20 mV. The brief exposure to dry, ambient temperature hydrogen appeared to accelerate the conditioning process, although the cells were still not completely conditioned yet.

The 10 new MEAs were then replaced again with similar newly assembled MEAs. This time, heated and humidified hydrogen (80° C. and 100% RH) was directed through both the stack anodes and cathodes for 5 minutes. The stack was then operated under load as before. This time, the average voltage of the new cells MEAs was 630 mV after starting while the average voltage of the original cells was 650 mV. After 10 hours of further operation under 50 A load, the average voltage of the original cells was 660 mV while that of the new cells was 650 mV.

Thus, the brief exposure to heated and humidified hydrogen brought the reconstructed stack almost to the nominal operating voltage (within 95% of normal).

EXAMPLE 2

Another similar solid polymer fuel cell stack comprising 47 cells stacked in series but slightly different flow plates was assembled and fully conditioned by operating it under load until its full normal performance capability was reached. Except for the number of cells, the construction of this stack was similar to that of the stack in Example 1. The normal operating conditions for this stack were also similar to that of Example 1 except that dry, unhumidified hydrogen was used as the fuel supply.

Under a 50 A load, the average voltage of the cells in this fully conditioned stack was about 620 mV/cell. The stack was then shutdown and stored for two months under ambient conditions. After the storage period, the stack was restarted without undergoing a conditioning procedure and was operated normally for an hour. The average voltage of the cells was 590 mV. Operation of the stack was then stopped and the stack was conditioned by flooding the cathode with partially humidified hydrogen gas for about five minutes. The stack was then started again and operated normally for an hour. This time, the average voltage of the cells was 610 mV immediately after starting and stabilized at the original 620 mV level after 10 hours of operation.

Thus, the brief exposure to partially humidified hydrogen brought the stored stack almost to the nominal operating voltage on startup.

EXAMPLE 3

Several solid polymer fuel cell stacks similar to those in Example 2 were assembled and fully conditioned by operating under load until full normal performance capability was reached. The stacks were then shut down by removing the load, reducing the fuel and oxidant reactant pressures, and closing the reactant inlets and outlets. The stacks were then stored at various different temperatures, namely −20° C., ambient (actually varying between 20 and 30° C.), and 70° C. The stacks were performance tested weekly by operating them under load for three hours at a time. Note that, to some extent, this weekly operation would itself be expected to condition the stacks and improve stack performance somewhat.

From the weekly testing, it was observed that the two stacks stored at −20° C. showed little to no voltage loss over seven months of storage and testing. The two cells stored at ambient showed stack voltage losses between about 0.1 and 0.33 V/month over 11 months of storage and testing. The several cells stored at 70° C. showed stack voltage losses of about 1.2 V/month over the first three months and then leveled off at a total stack voltage loss of about four volts thereafter over the total eight months of testing and storage. It was noticed that approximately ⅔ of the stack voltage loss was recovered over the three hours of testing (i.e., a significant but incomplete conditioning of the stack occurs over three hours of operation).

This example shows the temperature dependence of the performance (voltage) loss during storage and that the loss can be avoided by storing the fuel cell stack at suitably low temperatures.

While particular elements, embodiments and applications of the present invention have been shown and described, it will be understood, of course, that the invention is not limited thereto, except as by the appended claims, since modifications may be made by those skilled in the art without departing from the spirit and scope of the present disclosure, particularly in light of the foregoing teachings.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

What is claimed is:

1. A method for conditioning a fuel cell for normal operation, the fuel cell comprising a cathode, an anode, and an electrolyte, and normal operation comprising supplying fuel to the anode, supplying oxidant to the cathode, and supplying power from the fuel cell to an external electrical load, wherein the method comprises directing a fluid comprising hydrogen to the cathode without supplying oxidant to the cathode, and wherein the fluid comprising the hydrogen is heated and humidified before directing to the cathode.

2. The method of claim 1 wherein the method comprises directing the fluid comprising hydrogen to the cathode without supplying power from the fuel cell to the external electrical load.

3. The method of claim 1 wherein the cathode comprises a precious metal catalyst.

4. The method of claim 3 wherein the cathode catalyst comprises platinum.

5. The method of claim 1 wherein the fuel cell is a solid polymer electrolyte fuel cell.

6. The method of claim 1 comprising directing the reductant fluid to a cathode flowfield in the fuel cell.

7. The method of claim 1 wherein the conditioning is performed after manufacturing the fuel cell.

8. The method of claim 1 wherein the conditioning is performed after the fuel cell has been operated normally and then stored for a period of time.

* * * * *